United States Patent [19]

Blackford et al.

[11] Patent Number: 4,894,537
[45] Date of Patent: Jan. 16, 1990

[54] HIGH STABILITY BIMORPH SCANNING TUNNELING MICROSCOPE

[75] Inventors: Bradford L. Blackford; Douglas C. Dahn; Manfred H. Jericho, all of Nova Scotia, Canada

[73] Assignee: Canadian Patents & Development Ltd., Ottawa, Canada

[21] Appl. No.: 222,623

[22] Filed: Jul. 21, 1988

[51] Int. Cl.$^4$ .............................................. H01J 37/00
[52] U.S. Cl. .................................. 250/306; 250/442.1
[58] Field of Search .................. 250/423 F, 306, 447.1

[56] References Cited

U.S. PATENT DOCUMENTS 4,520,570  6/1985  Bedmorz et al. ................. 33/180 R
4,762,996  8/1988  Binnig et al. ..................... 250/442.1

OTHER PUBLICATIONS

"Scanning Tunneling Microscopy Study of Metals: Spectroscopy and Topography", Kaiser et al., *Surface Science*, 181, 1987, pp. 55–67.

B. L. Blackford et al., Rev. Sci. Instrum. 58 (8), Aug. 1987, 1343–1348.
B. Drake et al., Rev. Sci. Instrum. 57 (3), Mar. 1986, 441–445.
G. Binnig et al., IBM J. Res. Develop., vol. 30, No. 4, 355–369, Jul. 1986.

*Primary Examiner*—Bruce C. Anderson
*Attorney, Agent, or Firm*—Yoshiharu Toyooka

[57] ABSTRACT

A novel scanning tunneling microscope (STM) is described which is constructed almost entirely of one metal e.g. aluminum and uses bimorph piezoelectric disks as the x, y, z drive elements. The design uses a simple, rugged tirpod configuration for the fine motion drive arms. Coarse motion of the sample, which is mounted on an aluminum holder, is achieved by pushing, or pulling, with a piezoelectric louse. Differential thermal expansion effects are avoided by design, to first order, and the resulting drift is $\leq 0.5$ Å per minute after only a short warm-up period. It is easy to build and operate, and has good immunity to mechanical vibrations.

7 Claims, 5 Drawing Sheets

HIGH STABILITY BIMORPH SCANNING TUNNELING MICROSCOPE

FIELD OF THE INVENTION

The present invention relates to the scanning tunneling microscope (STM; and in particular it is directed to a new scanning tunneling microscope which has a high mechanical stability, a low thermal drift and high scan rates, due to its novel construction.

BACKGROUND OF THE INVENTION

U.S Pat. No. 4,343,993 Aug. 10, 1982 (Binning et al) describes the scanning tunneling microscope which has revolutionized the experimental study of surfaces. Atomic-resolution microscopy on a large class of materials, including insulators with the recent atomic force microscope (AFM), is now possible. In contrast to conventional surface science techniques (such as the scanning electron microscope), which are very expensive and also lack atomic resolution, the STM is feasible in laboratories with limited financial resources. STMs have been developed in many laboratories around the world and several different STM designs have been reported. Many exciting results are appearing in the literature. See, for example, the review by G. Binning and H. Rohrer, IBM J. Res. Develop., 30 (4), 355 (1986).

Further improvements are taught in U.S. Pat. No. 4,668,865 May 26, 1987 Gimzewski et al. In the patent, a novel (x, y) drive mechanism is described as being constructed of a semiconductor chip into which slots are etched to form stripes. Electrostatic forces created between stripes control their movements, thus the movements of the scanning tip relative to a sample under analysis.

In spite of these recent developments, there are still needs for improvements in various areas of the STMs, particularly in the areas of high mechanical stability, low thermal drift and high scan rates.

OBJECT OF THE INVENTION

It is therefore an object of the present invention to provide a STM which is mechanically stable.

It is still another object of the present invention to provide a STM which is substantially exclusively made of a high thermal and electrical conductive metal to ensure good thermal drift characteristics.

It is yet another object of the present invention to provide a STM which is construCted to isolate ambient vibrations for a good mechanical stability.

SUMMARY OF THE INVENTION

Briefly stated, the scanning tunneling microscope of the present invention includes a support block made of an electric and thermal conductive metal and adjustable sample holding means adjustably positioned on the support block to carry a sample thereon. It also has tunneling tip means which comprises an electrically conductive tunneling tip and x, y and z drive arms, the latters of which are made of the same metal as that of the support block and oriented along three orthogonal x, y and z axes respectively. The x, y and z drive arms are joined together at one end of each arm and carrying the tunneling tip thereat, the tip being oriented along the z axis and positioned at a predetermined distance away from the sample. The microscope further includes three bimorph disks, each connecting the support block and each of the x, y and z drive arms at the other end thereof for relative movements therebetween along the axis thereof and electrical means connected to the said three bimorph disks to control the said relative movements along x, y and z axes.

BRIEF DESCRIPTION OF THE ACCOMPANYING DRAWINGS

For more complete understanding of the present invention and for further objects and advantages thereof, references may now be made to the following description taken in conjunction with the accompanying drawings in which.

DETAILED DESCRIPTION OF THE PREFERRED EMBODIMENT OF THE INVENTION

Figure 1:
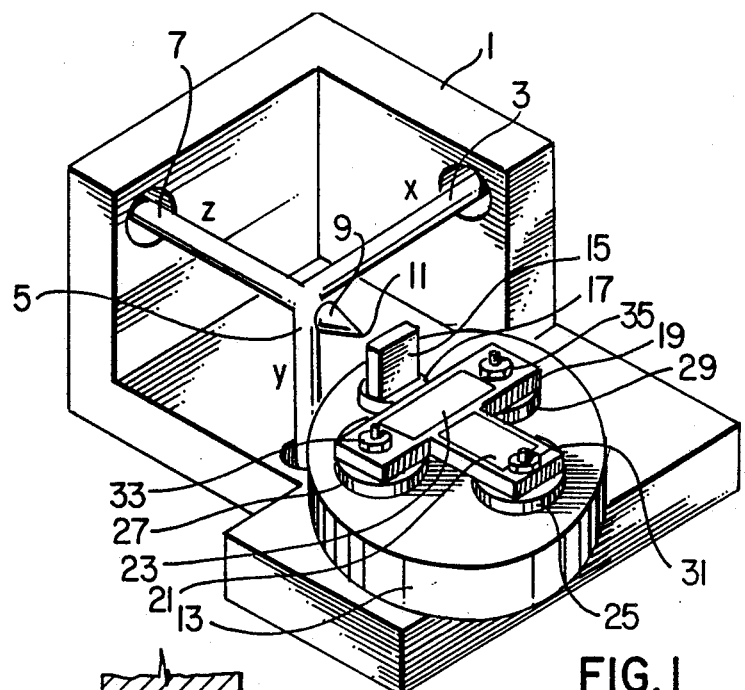
FIG. 1 is a schematic illustration of a part of the STM according to the present invention.

FIG. 1 illustrates schematically a part of the STM, according to an embodiment of the invention. In the figure, a support block 1 is machined from a single piece of aluminum and has three orthogonal walls. The thickness of the block in this embodiment is 12 mm and this substantial thickness contributes to good mechanical stability. X, y and z drive arms 3, 5 and 7 respectively are constructed of light weight aluminum tubing arranged in a rigid tripod configuration, conforming to orthogonal x, y and z axis respectively as shown in the figure. Since the support block, drive arms, and sample holder components 15, 17, are all made of the same metal, temperature changes have little effect on the spacing between the tunneling tip and sample. The high thermal conductivity of aluminum contributes further to low thermal drift by reducing thermal gradients. The three drive arms are joined together at one end and are equipped thereat with a tunneling tip holder 9 also made of aluminum. The tip holder 9 carries a tunneling tip in the direction of the z axis. The x, y and z drive arms 3, 5 and 7 are connected at their other ends to the support block 1 by means of three bimorph disks, not shown in the FIG. 1 but will be described in detail later. The three bimorph disks are made of piezoelectric material and control the movements of the drive arms along their respective axes.

A louse baseplate 13 is made of anodized aluminum and is clampably positioned on the support block 1. A sample holder 15 of aluminum is mounted on an anodized aluminum sample holder pad 17, 12 mm in diameter by 5 mm in height. The sample holder 15 is electrically insulated from the pad 17 by a thin layer of epoxy. A thin sample to be studied can be glued directly to the front face of the sample holder facing the tunneling tip. It is possible to mount a thick sample on the back side of the sample holder and to expose it to the tunneling tip through a hole drilled in the sample holder. Other mechanisms can be utilized for mounting a sample on the holder, e.g. a sample disk carrying a sample can be clipped on the holder by a spring for easy sample changes.

A louse 19 used for coarse positioning of the sample holder consists of a T-shaped piezoelectric plate on which electrodes 21 and 23 are formed with conductive silver paint. The electrodes define two extension regions, one for x motion (motion in x direction) and one for z motion (motion in z direction). Step sizes are in the range of 100–1000Å with voltages of 100–900 volts applied to the arms of the T-shaped plate. The louse 19 rests on three anodized aluminum louse feet 25, 27 and 29 through flexible ball-cone joints. The bottom ends of three brass screw 31, 33 and 35 are soldered with steel bearing balls and form the ball portions of the joints. In the center of each of the anodized aluminum feet is a well machined with a steep V-shaped cone which forms the cone portion of each joint. The flexibility of the joint allows the feet to adjust to large scale curvature of the louse baseplate 13. The brass screws are insulated from the piezoelectric plate by mylar (Trade Mark) washers and provided with copper wires at their top ends to facilitate electrical contacts to respective anodized feet. Typically 50 volts are applied to the feet to electro-statically clamp the feet to the baseplate 13.

The sample holder pad 17 is also provided with a copper wire so that it can be electrostatically clamped to the baseplate 13 independently of the anodized aluminum feet. The pad therefore follows the motion of the louse 19 in the xz plane but is only loosely coupled to it in the y direction. During a tunneling run the sample holder pad 17 is clamped to the baseplate, while the louse feet are left free. This improves mechanical stability and eliminates thermal drifts caused by differential thermal expansion of the piezoelectric plate of the louse 19.

Figure 2:
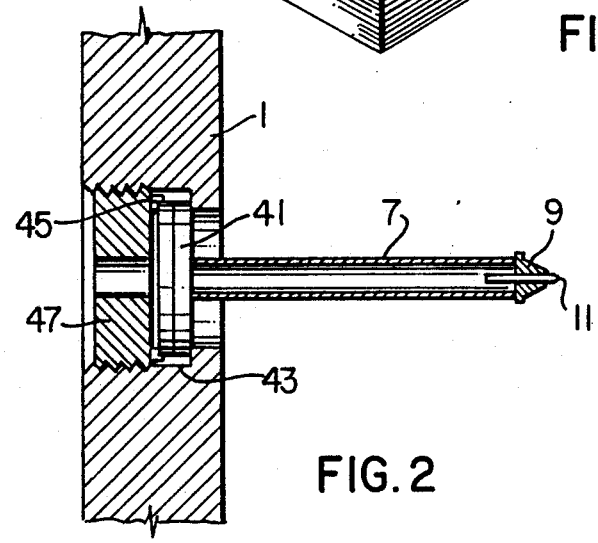
FIG. 2 is a detailed cross sectional view of one of the three drive axes and its associated parts.

The x, y and z drive arms are driven by three bimorph disks, one bonded to the end of each arm. FIG. 2 illustrates schematically the z drive arm and other associated parts. As explained earlier, the z drive arm 7 is constructed of a light aluminum tubing. At one end is provided the tip holder 9 of also aluminum which carries a tunneling tip 11. At the other end of the z drive arm is bonded a bimorph disk 41 which is housed in a flanged hole drilled in the support block 1 and is held against the flange surface by a compressible gasket or a spring 45 by means of a screw 47 made also of aluminum. The bimorph disk is 2 mm thick by 14 mm diameter and is made of Channel 5800 (Trade Mark) material. The drive arm is bonded to the bimorph disk with Eccobond (Trade Mark) 285 epoxy whose thermal expansion is close to that of aluminum. Longitudinal differential thermal expansion between the bimorph disk and the block is accommodated by compression of the spring. In the radial direction, differential thermal expansion of the disk is accommodated by slippage of the disk along the flange surface, rather than by buckling of the disk. The net result is that differential thermal expansion of the bimorph disk does not move the drive arm with respect to the support block of the STM, at least in first order. The hole housing the disk also serves to shield it electrically. The x and y drive arms are provided with bimorph disks and attached to the support block in the same fashion.

The tunneling tip is made from 0.5 mm diameter tungsten wire mounted in the conically shaped tip holder 9 which screws into the end of the z drive arm. The wire rests firmly, but not tightly, in an insulating epoxy sleeve on the axis of the tip holder. The rigid connection between the wire and the tip holder is made by a local epoxy bond very near the tip. The short portion, <0.5 mm, of the wire beyond the epoxy is the only portion whose thermal expansion is of importance. The tungsten wire is electrically insulated from the drive arm by the epoxy. Electrical connection to the tungsten wire is made by a fine insulated wire running inside the drive arm. This arm also provides electrical shielding for the sensitive tunneling tip circuit. The tunneling tip is sharpened to a 45 conical point by mounting the tungsten wire in a lathe and using a hand held grindstone. No further tip preparation is given, except for cleaning by wiping with a propanol soaked tissue.

Figure 3:
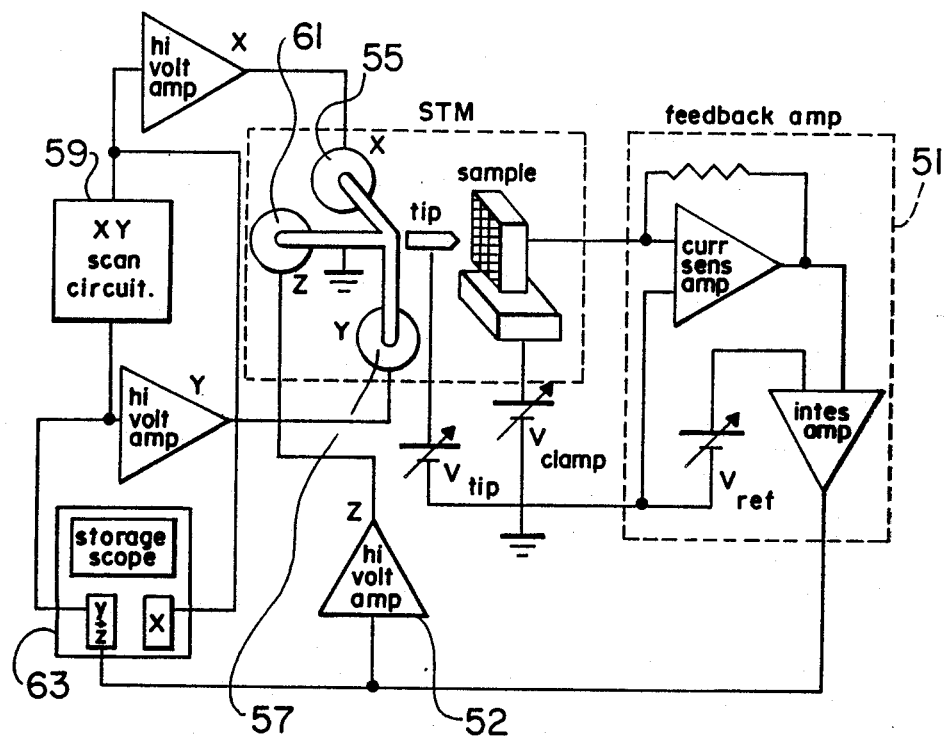
FIG. 3 is a block diagram of the electronic circuit of the STM according to the present invention.
Figure 4:
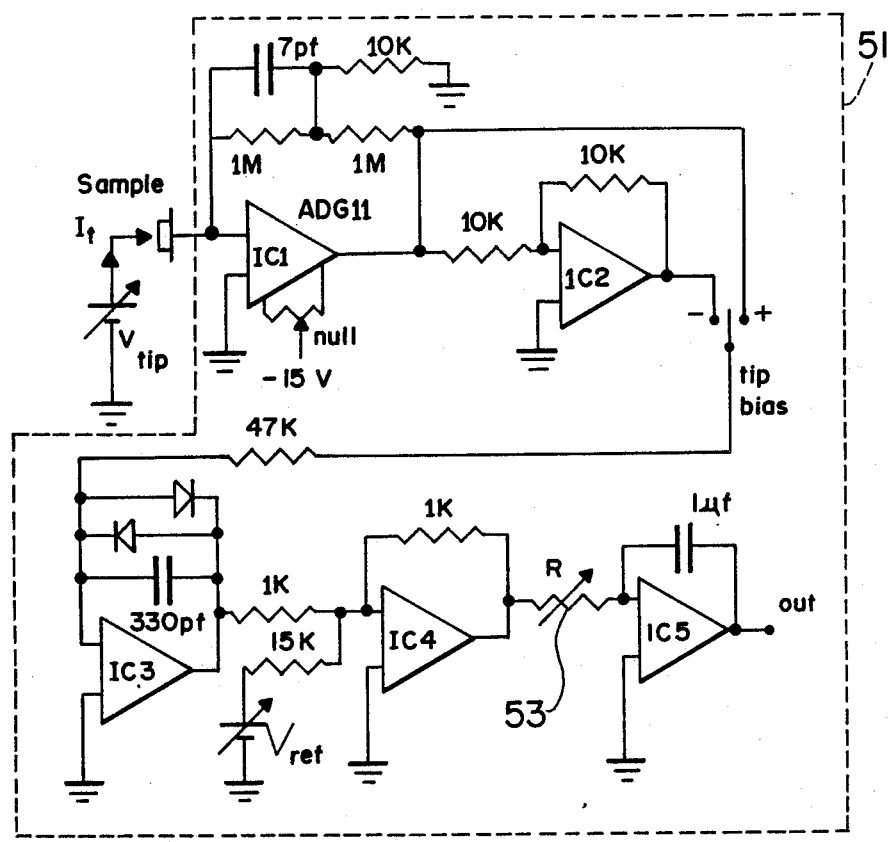
FIG. 4 is a detailed schematic diagram of the feedback amplifier.

As is usual in tunneling microscope the tip-to-sample spacing is controlled by a feedback system which drives the z-bimorph (the bimorph disk on the z drive arm). FIG. 3 shows a block diagram of the STM electronic circuit according to the present invention. The circuit embodies the feedback system including a feedback amplifier 51, whose detailed schematic is shown in FIG. 4. The tunneling tip is held at a fixed bias voltage, $V_{tip}$. The sample is at virtual ground, being connected to the input of a current to voltage converter (IC1).

The output of IC1 is the input to an optional unity gain inverter (IC2) which is used to maintain negative feedback conditions when the tip bias is reversed. The logarithmic stage (IC3) improves the stability of the feedback system, although it is possible to operate without it. The next step is subtraction of (using IC4) an adjustable references voltage $V_{ref}$, which sets the tunneling current, followed by integration of the error signal. The output of the integrator IC5 drives the z-bimorph through a high voltage amplifier 52.

This feedback system allows two different modes of imaging surface structures, constant current mode and variable current mode.

(i) Constant current mode

Figure 5A:
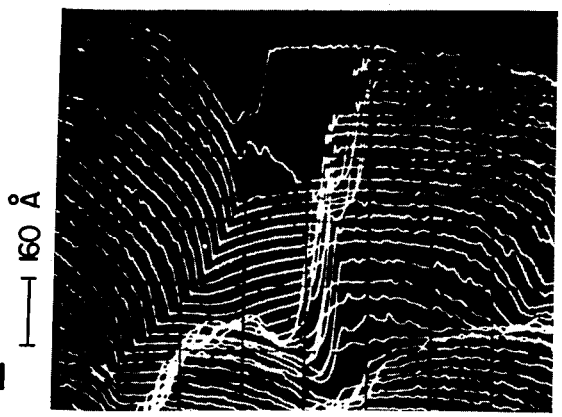
FIGS. 5a, 5b and 5c are experimental images displayed on an oscilloscope.
Figure 5B:
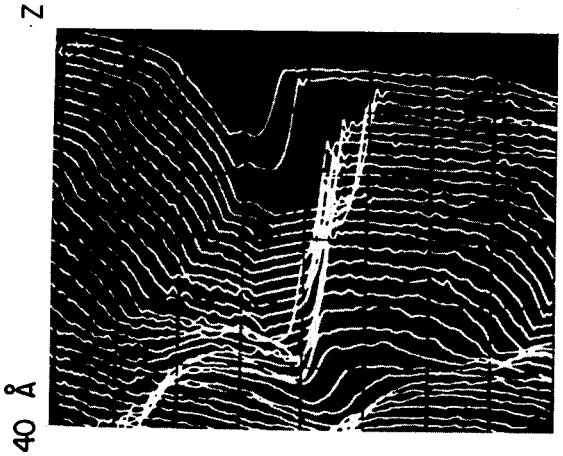
Figure 5C:
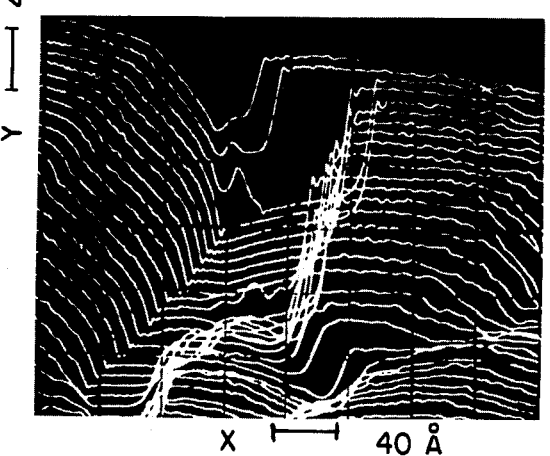

In the constant current mode, which was the original usage, the frequency response is made as high as possible by reducing the resistance R of the resistor 53. The tip is scanned over the surface in a raster pattern by x and y bimorphs 55 and 57 driven by an xy scan circuit 59, slowly enough that the tunneling current stays constant. The tip then follows the surface structure and the feedback voltage applied to the z bimorph contains the information about the surface topography. The data is displayed on a storage oscilloscope screen 63. For each trace, the horizontal axis is the voltage applied to the x bimorph amplifier, and the vertical axis is the sum of the voltages applied to the y and z amplifiers as shown in FIG. 3. Scans are recorded in one direction only and the return trace is blanked. Examples of this type of images are shown in FIGS. 5a, 5b and 5c. Scanning rates are limited to a few Hz, with this mode, because the system oscillates at high frequency when the resistance R is reduced below a critical value, which depends on surface conditions. Similar behavior is reported by many STM users. Such oscillations are expected in a feedback system.

(ii) Variable current mode

In this more recent high speed variable current mode, the resistance R and the scanning rate are increased so that the feedback system does not respond to frequencies corresponding to the surface structure. The information about the surface is then expressed as a modulation of the tunneling current itself. To display an image in this mode, the tip is scanned over the surface in a raster pattern with the x and y voltages driving the horizontal and vertical axes of the scope, respectively. The tunneling current signal is used to control the intensity of the trace. This type of display clearly shows the symmetry of the surfaces but does not give a quantitative readout of the current variations. Examples of this type of image are shown as FIGS. 6 and 7. Alternatively, the current signal can be added to the vertical axis input of the scope, to give quantitative information. At present, the scan rate is limited by the bandwidth of the current measuring circuit and is about 100 Hz maximum which corresponds to a complete image in about 1 second.

The motion of the louse 19 is controlled by applying properly sequenced voltages to the T-shaped piezoelectric plate and the clampable feet. The voltages are turned on and off by FET switches, controlled by 5-volt logic signals from a microcomputer. Two dc power supplies are used, one 0–800 volts for the piezoelectric area and one 0–200 volts for the feet. The maximum stepping rate is $\simeq 20$ steps per second, which is limited by the computer used. The direction of motion can be reversed by software changes or by a hardware switch box which is installed between the FET switches and the louse.

Performance (i) Long term stability

The STM described above has been used in air to study the surface of a Au film deposited on mica, cleaved pyrolytic graphite and $NbSe_2$. From the very first tunneling approach, it was apparent that this STM design has good performance. Drift was never large and within an hour, had settled down to 0.5 Å per minute, or less. This has been confirmed by many subsequent tests ranging in duration from several minutes to seven hours. The same drift is expected for all three translator directions x, y and z because of their identical design and construction. The quoted drift is the apparent drift in the z direction, as determined by monitoring the feedback voltage on the z-bimorph. This includes real z drift as well as drift in the x and y directions over sloping surfaces. The intrinsic drift value should therefore be even less than 0.5 Å per minute.

No evidence was found for the piezoelectric creep reported by Drake et al for a semi-circular bimorph element, also from channel 5800 (T.M.) material (see Rev. Sci. Instrum. 57, 441, 1986). It is suspected that the difference is due to the method of mounting the bimorph. In their case it was simply resting on three supports, whereas in the present invention it was clamped all the way around the outer region.

(ii) Stability against vibration

The present invention is quite insensitive to normal building vibrations and laboratory sounds. For example, in the constant tunneling current mode, the feedback voltage on the z-bimorph is not affected by slamming doors several meters away or by normal conversation at one meter. Clapping hands immediately outside the wood cover box causes only minor changes.

(iii) Frequency response and cross coupling

The frequency response of the STM was measured by applying an ac signal to one of the bimorph disks and detecting the output from either of the other bimorphs. A lock-in amplifier was used as the detector, to get both amplitude and phase information. The response was flat, within 5%, for frequencies up to 5 kHz and the corresponding phase shifts were less than 15°. Weak resonances (x2) occurred at 7.2 and 10.6 kHz. Strong resonances (x10 to x40) occurred at 13, 14, 16, 20, 50 and 54 kHz. At higher frequencies the response decreased rapidly. The same results were obtained by exciting the x-bimorph and detecting with the z-bimorph, or vice versa. The conclusion is that the present STM can be used at scan rates up to 5 kHz, without signal degradation due to lack of mechanical fidelity. The frequency response measurements also give useful information about the cross coupling between bimorphs. An input signal of 3.5 volts in one bimorph produced 5.6 millivolts in the other bimorphs, giving a cross coupling coefficient of $\simeq 0.0016$. This is less cross coupling than obtained with STM's using piezoelectric scan arms.

(iv) Calibration and range

The calibration factor, or sensitivity, of the bimorph drives is 8.0 ±0.5 Å per volt. This was determined from atomic images obtained on graphite and $NbSe_2$, operating the STM in air. Examples of the results are given below. The rather large uncertainty is due to the skewed images and other distortions obtained, which are believed to be intrinsic to the surfaces studied. A calibration factor was obtained for both x and y drives and they agreed within the stated uncertainty. The calibration factor for the z drive is assumed to be the same as the others, because of its identical design. One can easily apply 500 volts to the bimorphs without concern for strain damage, therefore the maximum range is at least 4000 Å in each direction. The range can be increased further by using larger and/or thinner bimorph disks. These changes would however decrease the mechanical rigidity of the disks and reduce resonance frequencies.

(v) Examples of experimental results

FIGS. 5a, 5b and 5c show a low resolution, topographic STM images, in air, of a 1200 Å thick gold film evaporated on a cleaved mica substrate. The mica substrate was cleaved in air prior to placement in the diffusion-pumped vacuum chamber. During pumpdown to a background pressure of $5 \times 10^{-4}$ torr, the substrate was exposed to glow discharge for 10 minutes at 0.1 torr of air. The gold was evaporated from a resistance heated tungsten filament and deposited at a rate of 10 Å per second.

The images in FIGS. 5a, 5b and 5c are photographs taken from a storage oscilloscope screen, using the electronics in the constant-tunneling-current mode, as described above. The surface texture is similar to that observed by other researchers for Au and Ag films. It is characterized by broad hilly regions separated by steeper valleys, the so-called "island structure". The steep canyon-like structure in the center of the figure may, however, be the result of previously touching the surface with the probe tip.

Interesting dynamic changes were observed in the region of the canyon floor. These changes are depicted in the sequential images of FIGS. 5a, 5b and 5c, which were taken at 4 minute intervals. (Each image required 30 seconds to produce). In FIG. 5a, the floor of the canyon is quite flat, while in FIG. 5b, a prominent inclusion has appeared on the left side of the canyon and extends all the way to the lower left corner of the figure. In FIG. 5c the inclusion has almost entirely disappeared and the image is essentially the same as in FIG. 5a. In subsequent scene over the same are the image stayed like that of FIG. 5c. The appearance of hillocks on gold has been reported by others and attributed to the deposition of material from the tip to the sample. This could explain the present case, but instabilities of the Au film or underlying mica are also possible explanations. Regardless of the explanation, it is a good example of the usefulness of a low drift STM for studying such phenomena. Note that the hill region in the upper left of the figures did not change noticeably during the entire sequence, which confirms the stability of the present STM.

Figure 6:
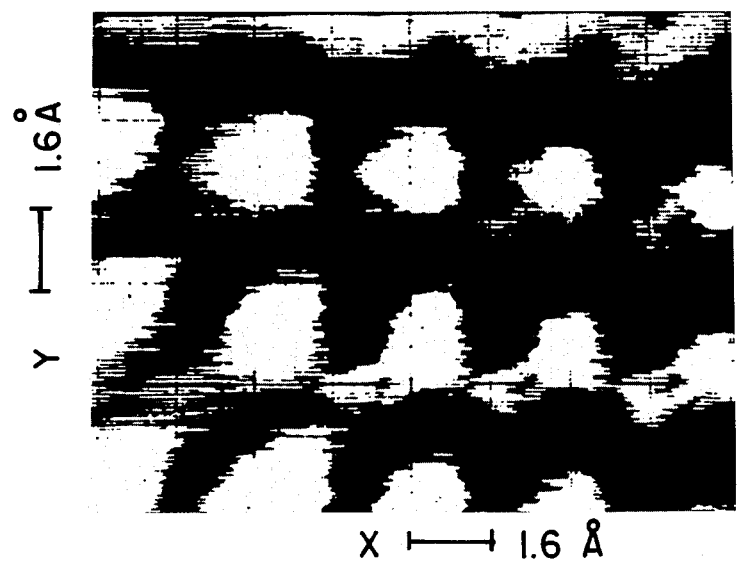
FIGS. 6 and 7 are of different experimental imaged displayed on an oscilloscope.
Figure 7:
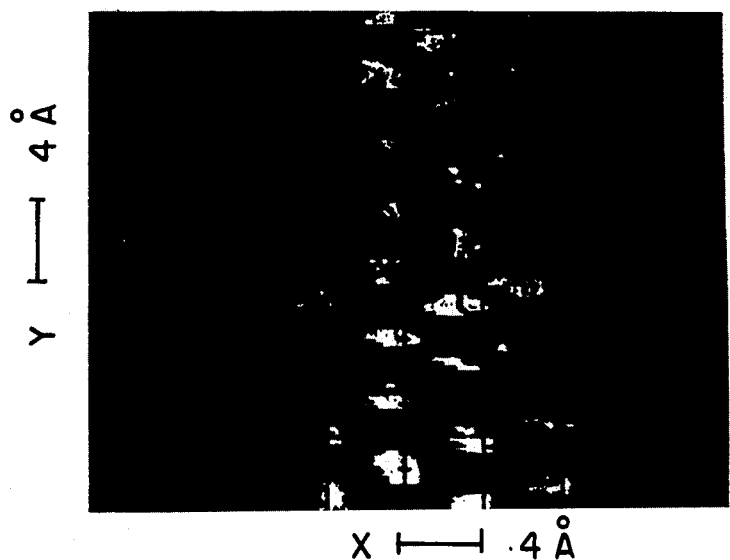

FIGS. 6 and 7 show high resolution atomic STM images of cleaved pyrolytic graphite and NbSe$_2$, respectively, using the variable tunneling current mode described above. These images were obtained in air. The intensity modulation signal was sometimes high-pass filtered to remove frequency components near the scan frequency, caused by sloping surfaces. The frequency of the atomic signal depends on the number of atoms scanned, but was typically ten times higher than the scan frequency. images on the screen. The filtering produced better uniformity of the atomic Possible Modifications and Improvements (i) Miniaturization The STM of FIGS. 1 and 2 could easily be reduced in size. One approach would be to put the louse in the space enclosed by the x, y and z drive arms, thereby reducing the size by roughly a factor of two in the z direction. Another approach would be a linear down scaling by a factor of two or three in each direction, thereby reducing the volume by an order of magnitude. The scaling properties of the bimorph disks would be an important consideration. The piezoelectric motion of the disk is proportional to (diameter/thickness)$^2$, at constant voltage, and the motion would therefore be preserved in a linear scaling. The mechanical rigidity of the disks is proportional to (diameter/thickness)$^3$ and would also be preserved in a linear scaling. Since the smaller size instrument would be less susceptible to external vibrations, vibrational noises of the STM should decrease. Other benefits of miniaturization would be higher frequency response and more suitable size for operation in high vacuum and in low temperature cryostats.

(ii) High vacuum operation

The present STM is ideally suited for operation in high vacuum. Once the sample has been mounted and the louse roughly positioned to place the sample in close proximity to the tip, no further mechanical contact is necessary. Low vapor pressure epoxy and electrical leads would be necessary.

(iii) Variable temperature operation

The present STM design should work satisfactorily at temperatures ranging from $=100°$ C. down to liquid helium temperatures. Similar bimorph piezo disks have been operated at liquid nitrogen temperature with only a factor of two loss in expansion sensitivity. Epoxy bonds are reliable down to liquid helium temperatures. The thermal compensation inherent in the design should also make continuous variable temperature operation possible. Contamination of the louse's walking surface, with moisture or other condensates, may cause sticking problems at low temperatures but these could be avoided by operation in clean, high vacuum conditions.

(iv) Bimorph louse

A louse can be constructed by using bimorph disks and aluminum connecting tubes in place of the piezoelectric T piece of the louse in FIG. 1. The advantages of such a louse should be low thermal drift and retention of step size in miniaturized versions, since the bimorph motion is independent of linear scaling.

We claim:

1. A scanning tunneling microscope, comprising:
   a support block made of an electric and thermal conductive metal, and having three orthogonal walls, each having a flanged hole therein,
   adjustable sample holding means adjustably positioned on the said support block to carry a sample thereon,
   tunneling tip means comprising an electrically conductive tunneling tip and x, y and drive arms, the latters of which are made of hollow tubes of the same metal as that of the said support block and oriented along three orthogonal x, y and z axes respectively, the said x, y and z drive arms being joined together at one end of each arm and carrying the said tunneling tip thereat, the said tip being oriented along the z axis and positioned at a predetermined distance away from the said sample to produce a tunneling current therebetween,
   three bimorph disks, each being clamped at its perimeter in the said flanged hole and connecting the said support block and each of the x, y and z drive arms at the other end thereof, for relative movements therebetween along the axis thereof, and
   electrical means connected to the said three bimorph disks to control the said relative movements along x, y and z axes.

2. The scanning tunneling microscope, according to claim 1, wherein the said adjustable sample holding means comprise:
   a louse baseplate to be adjustably located on the said support block,
   louse means including a piezoelectric plate and having three feet to stand on the said louse baseplate, and
   a sample holder carrying the said sample and being located on the said louse baseplate in contact with the said louse means to move therewith.

3. The scanning tunneling microscope, according to claim 2, wherein:
   the said louse baseplate, the said three feet and the said sample holder are made of aluminum and are formed with an anodized layer on the surfaces thereof, and
   electrical connections are provided on the said louse baseplate, the said three feet and the said sample holder to electrostatically clamp the same to surfaces on which they are located.

4. The scanning tunneling microscope, according to claim 2, wherein:
   electrodes are provided on the said piezoelectric plate to controllably deform the same so that the said sample holder can be moved.

5. The scanning tunneling microscope, according to claim 1, wherein the said tunneling tip means further comprise:
   a conical tip holder of aluminum attached at the end of the z drive arm and carrying the said tunneling tip made of tungsten in an electrically insulating fashion from the said conical tip holder, and
   an electrically conductive wire positioned within the z drive arm and connecting the said tunneling tip.

6. The scanning tunneling microscope, according to claim 1, wherein the said electrical means comprise:

xy scanning means for controlling the relative movements in a xy plane so that the said tip scan the said sample in xy plane.

7. The scanning tunneling microscope, according to claim 6, wherein the said electrical means further comprise:

z electrical position means for controlling the relative movement along the z axis in response to the tunneling current between the tip and the sample so that the tip is positioned always at a predetermined distance away from the surface of the sample.

* * * * *